United States Patent
Feng-Long

(10) Patent No.: US 6,893,354 B2
(45) Date of Patent: May 17, 2005

(54) METHOD FOR MANUFACTURING COLD-FORGED WING NUTS

(76) Inventor: Wu Feng-Long, 343 Fu Hsing Rd., Lu Chu Hsieng Kaohsiung Hsien (TW)

( * ) Notice: Subject to any disclaimer, the term of this patent is extended or adjusted under 35 U.S.C. 154(b) by 50 days.

(21) Appl. No.: 10/441,633

(22) Filed: May 19, 2003

(65) Prior Publication Data

US 2004/0235577 A1 Nov. 25, 2004

(51) Int. Cl.⁷ .............................. B21D 53/24; B21H 3/08
(52) U.S. Cl. ............................... 470/23; 470/25; 470/26
(58) Field of Search .............................. 470/18, 23, 25, 470/26, 108, 109, 197; 411/435

(56) References Cited

U.S. PATENT DOCUMENTS

| | | | | |
|---|---|---|---|---|
| 1,395,762 A | * | 11/1921 | Muff | 470/23 |
| 2,614,274 A | * | 10/1952 | Moore | 470/23 |
| 2,714,450 A | * | 8/1955 | Chestnut | 72/256 |
| 5,060,331 A | * | 10/1991 | Shie | 470/23 |

* cited by examiner

Primary Examiner—Ed Tolan
(74) Attorney, Agent, or Firm—Pro-Techtor International Services

(57) ABSTRACT

A method for manufacturing cold-forged wing nuts is to have a column linear material rolled and compressed into lots of column material units connected continuously and then receiving the steps of shearing, flattening, compressing and trimming, punching, wing forming and threading, able to produce wing nuts with quickness and with less waste material, and also having standardized specifications and high strength as well as property of corrosion resistance. Besides, one more step of forming insert grooves is added between the step of flattening and the step of compressing and trimming, so that the column with wings material unit can be formed with insert grooves, and after finishing the steps of punching, wing forming and threading, a nylon or metallic sheet is inserted in the insert groove and fixedly riveted to produce a wing nut able to prevent loosening under a low or high temperature.

1 Claim, 4 Drawing Sheets

METHOD FOR MANUFACTURING COLD-FORGED WING NUTS

BACKGROUND OF THE INVENTION

1. Field of the Invention

This invention relates to a method for manufacturing cold-forged wing nuts, particularly to one having a column linear material rolled and compressed into a wing-shaped linear material first and then carrying out a series of processing steps including shearing, flattening, compressing and trimming, punching, forming of wings and threading, able to quickly produce wing nuts having high strength and corrosion resistance under a condition of producing less waste material. Particularly, one more step of forming insert grooves is added between the two steps of flattening and compressing-trimming to let each sheared material formed with insert grooves which, after the step of threading, is inserted therein with a nylon or metallic sheet and then fixedly riveted together to make up wing nuts able to prevent loosening whether temperature is low or high.

2. Description of the Prior Art

Generally, hexagonal and quadrangular nuts are most commonly used for the present because they can be manually screwed and unscrewed conveniently. Such nuts are widely applied to daily articles, such as the positive and the negative poles of a battery, a TV antenna, a collapsible bike and the like.

However, the conventional methods of manufacturing wing nuts have some defects described below.

1. The method of compressing thin steel plate into shape, as shown in FIG. 9A, has the following drawbacks.

(A). A metallic material used is comparatively thin so it is easy to split in the process of threading, resulting in many unqualified products.

(B). A nut body is not solid so it is liable to oxidize and corrode in case of being exposed outdoors. Especially, the two wings of the wing nut are most likely to be broken by turning around, giving rise to inconvenience in screwing and unscrewing.

(C). Compression formed, the nut body is easy to produce sharp hairy edges to cut and hurt a user's hand.

(D). In the process of compression forming, part of the metallic material may be wasted, thus wasting metal material and lowering economic gain.

2. Method of iron casting: Iron liquid is injected into a mold to be cast into shape, as shown in FIG. 9B. Although the nut cast in this way is solid, yet it has the following defects.

(A). The cast wing nut has a rough surface, having poor feeling of touch.

(B). The opening for injecting iron liquid forms a sharp notch in the surface of finished nut, likely to cut and hurt a user's hand.

(C). After cooled and shrunk, the cast nut is likely to produce stress concentration, rendering its two wings easy to be broken by a comparatively large external force.

SUMMARY OF THE INVENTION

A first objective of the invention is to offer a continuous producing process able to produce wing nuts with quickness.

A second objective of the invention is to enable a horizontal wing nut special cold-forging machine, which is designed according to the foresaid producing process, to produce wing nuts automatically.

A third objective of the invention is to standardize the specifications of wing nuts by means of a unified producing process.

A fourth objective of the invention is to offer a method for producing wing nuts by cold forging so as to let the wing nuts have properties of high strength and corrosion resistance.

A fifth objective of the invention is to offer a method for manufacturing cold-forged wing nuts, able to almost fully utilize linear material, reduce waste material to the minimum and elevate economic gain.

A last objective of the invention is to offer a method for manufacturing cold-forged wing nuts, able to produce wing nuts of high quality and reduce unqualified products to the minimum.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of a method for manufacturing cold-forged wing nuts in the present invention, as shown in FIGS. 1 to 4, includes the following steps, which are carried out continuously and automatically in a horizontal wing nut special cold-forging machine.

1. Rolling and compressing: A column linear material is automatically conveyed by a feeder to a press to be rolled and compressed into lots of column material with wings connected continuously and respectively having its intermediate portion formed into a bulky flat column and its opposite ends respectively formed into a projecting wing.

2. Shearing: The linear material finishing the first step is cut into many units of column material with wings respectively having a proper length by means of the scissors controlled by the shearing mold and the cam of a shearing machine.

3. Flattening: Each unit of column material with wings is conveyed into a flattening mold to have its two sheared uneven sides forged flat, and clamped and turned over for 180 degrees by a pair of turnover tongs 1 and then moved forward to a fourth step for compressing and trimming.

4. Compressing and trimming: Each unit of column material with wings is conveyed into a compression mold to have the opposite sides of the center of its flat column compressed inward and forged into two symmetrical recessed grooves respectively having an obtuse angle and simultaneously having the circumferential edges of the two recessed grooves forged outward and trimmed to make up a half-finished product. Subsequently, the half-finished product is clamped and turned over for 180 degrees by a pair of turnover tongs 2 and moved forward to a fifth step of punching.

5. Punching: The half-finished product finishing the fourth step has its two recessed grooves punched into a through hole and then the half-finished product is clamped by a pair of level-shift tongs 3 and conveyed forward to a sixth step of forming wings.

Figure 1:
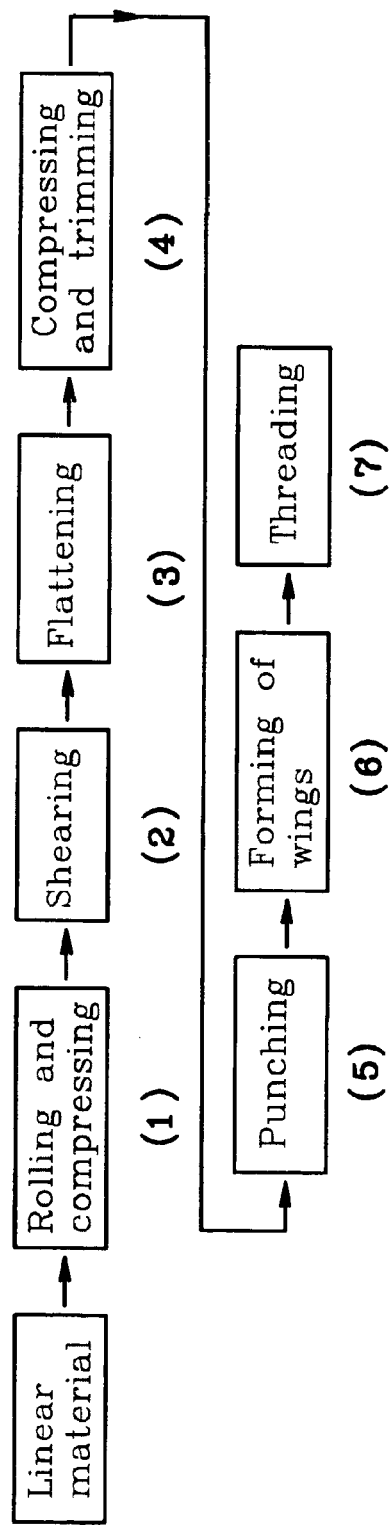
FIG. 1 is a flow chart of a method for manufacturing cold-forged wing nuts in the present invention.
Figure 2:
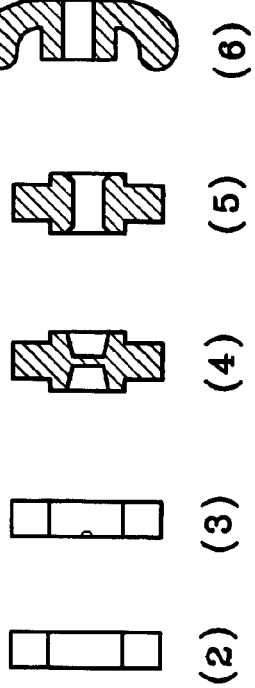
FIG. 2 is an evolved and cross-sectional view of the producing process of the wing nuts in the present invention.
Figure 2:
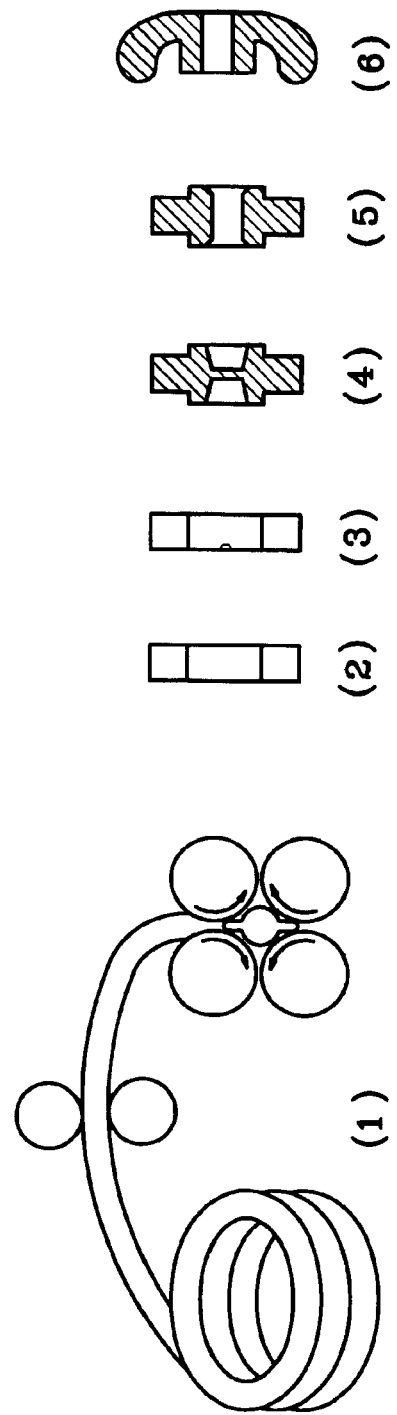
Figure 3:
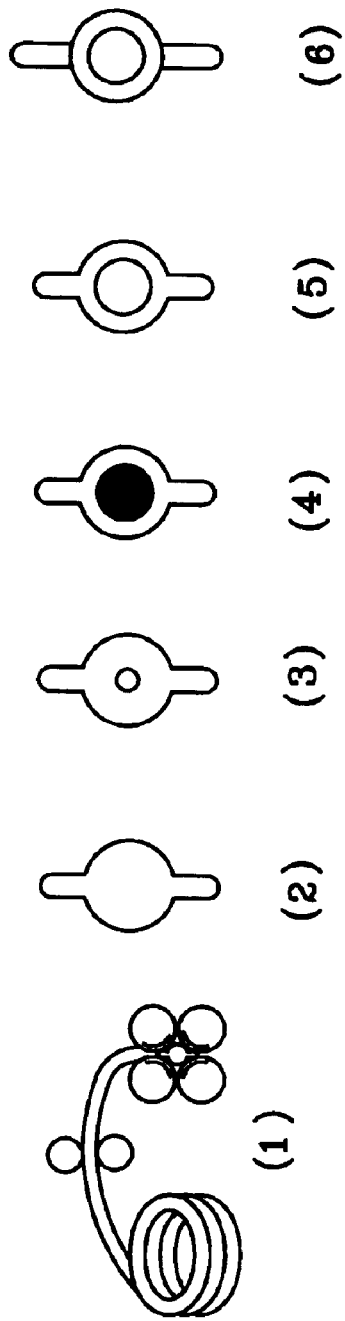
FIG. 3 is an evolved view of a producing process of the wing nuts in the present invention.
Figure 5:
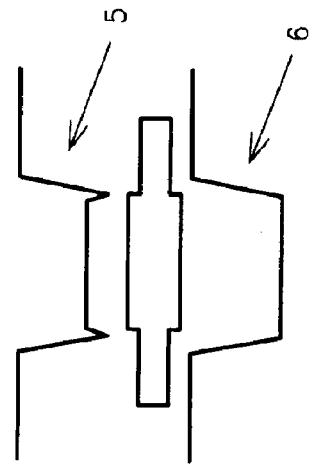
FIG. 5 is a side view of a movable press mold and a stationary press mold in molding two wing portions of a wing nut in the present invention.
Figure 4:
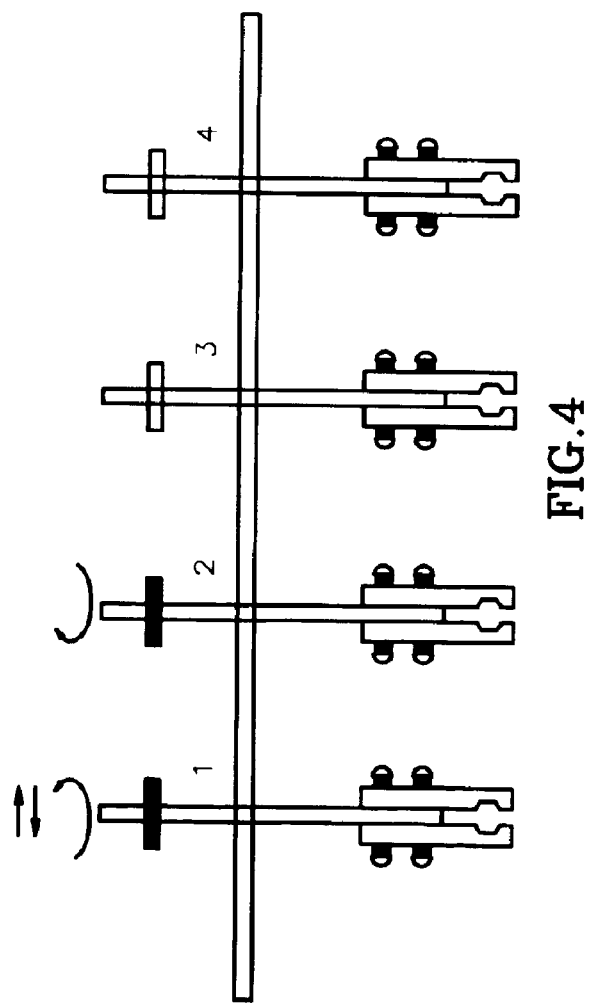
FIG. 4 is a front view of two compression molds compressing and forming two wings of the wing nut in the present invention.

6. Forming of wings: The half-finished product coming from the fifth step has its opposite projecting wings forged and compressed by the slope surfaces of a movable press mold 5 and a stationary press mold 6 and formed into two wings which respectively extend up and become wider and flatter, as shown in FIG. 5. Then, the almost finished product is removed out of the two molds 5, 6.

After finishing the above-mentioned six processing steps, the almost finished products are tidied and conveyed to a threading machine to be threaded to complete the wing nuts. As can be noted from the above description, the wing nuts in the present invention are cold forged automatically and continuously through only a few processing steps without wasting much material, and cold forged wing nuts are of standardized specifications and have high strength as well as property of corrosion resistance, able to heighten economic gain.

Figure 6:
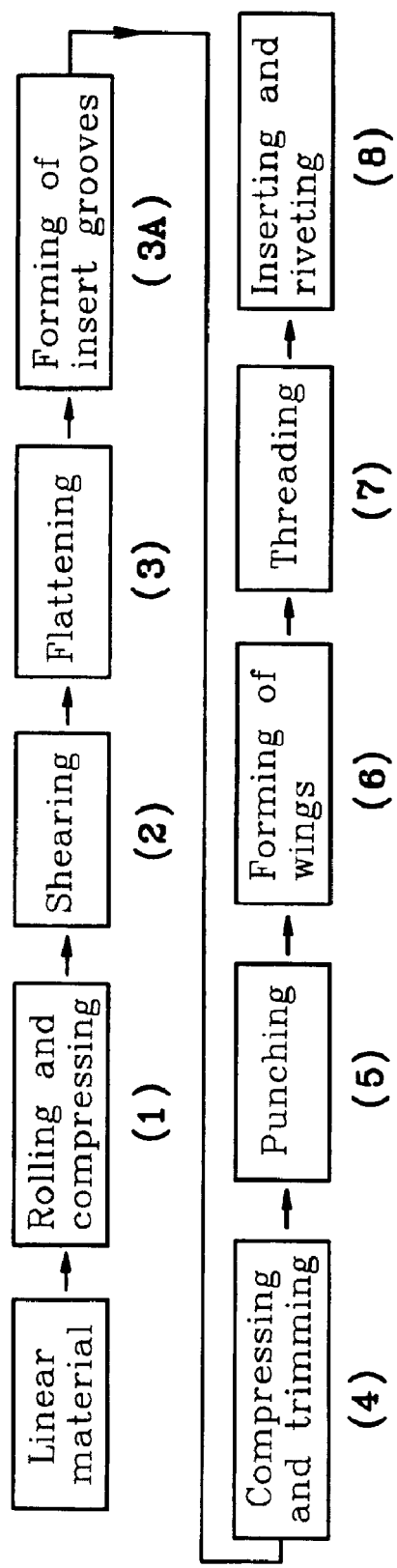
FIG. 6 is a flow chart of the method for manufacturing cold-forged wing nuts in the present invention, indicating that a step of forming an insert groove is added between the steps of flattening and compressing-trimming.
Figure 7:
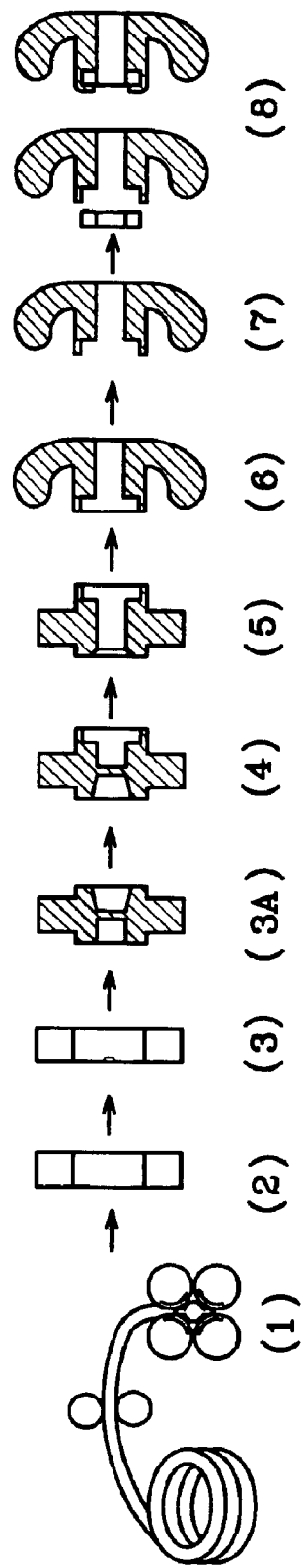
FIG. 7 is an evolved view of the producing process of the wing nuts in the present invention, indicating that the step of forming the insert groove is additionally provided.
Figure 9:
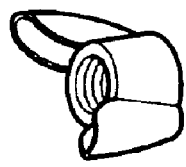
Figure 9:
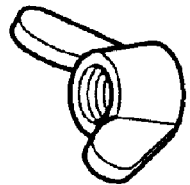
Figure 8:
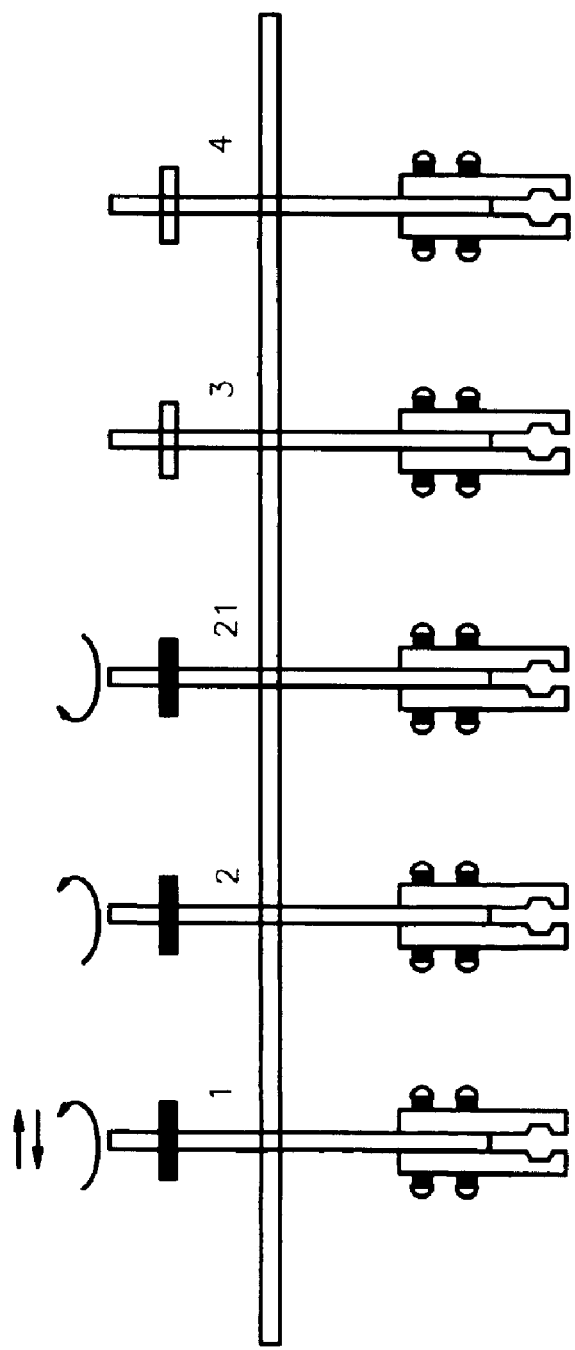
FIG. 8 is a front view of the tongs used in the producing process of the wing nuts in the present invention, having the step of forming the insert groove added to the producing process; and, FIG. 9 is perspective views of two kinds of conventional wing nuts.

In addition, in this invention, one more step of forming insert grooves may be added between the third and the fourth step of the flattening and the compressing and trimming, as shown in FIGS. 6, 7 and 8. The producing steps are as follows (the first and the second producing steps are the same as described above).

3. Flattening: After the material finishing the second step is flattened, it is clamped and turned over for 180 degrees by a pair of turnover tongs 1 and then moved forward to the next step 3A.

3A. Forming of an insert groove: The opposite sides of the center of the flat column of the material are compressed inward by an insert-groove mold and respectively forged into a recessed groove with an obtuse angle at one side, and a roughly formed insert groove without an obtuse angle at the other side. Afterward, the material is clamped and turned over for 180 degrees by a pair of turnover tongs 2 and conveyed forward to the fourth step.

4. Compressing and trimming: The material finishing the 3A step is compressed and forged to have two trapezoidal insert grooves. Then, this roughly shaped product is clamped and turned over for 180 degrees by a pair of turnover tongs 21 and conveyed forward to the fifth step.

After finishing the fifth step of punching, the roughly-shaped product is clamped by a pair of level-shift tongs 3 and moved forward to receive the process of forming two wings in the sixth step, and after two wings of the nut are formed by forging, the roughly-shaped product is removed out of the molds 5, 6 by a pair of level-shift tongs 4 and then conveyed to a tidying machine to be tidied. After finishing the seventh step of threading by means of a threading machine, the finished product is moved in an eighth step of inserting a nylon or metallic sheet in the insert groove and fixedly riveted to finish producing the wing nuts which are able to prevent loosening under low or high temperature.

While the preferred embodiment of the invention has been described above, it will be recognized and understood that various modifications may be made therein and the appended claims are intended to cover all such modifications that may fall within the spirit and scope of the invention.

I claim:

1. A method of manufacturing cold-forged wing nuts comprising the following steps:

(a) rolling and compressing material into linear columns, each said column comprising a plurality of wing material units connected to each other, and each said column of wing material units having an intermediate portion formed as a bulky flat column with opposing projecting wings;

(b) shearing said linear columns so that said plurality of wing material units are separated into individual independent wing material units, said shearing being achieved by scissors controlled by a shearing mold and a cam of a shearing machine, each said wing material unit becoming a roughly-shaped material unit after shearing;

(c) flattening by forging two sheared uneven sides of each said material unit, each said material unit maintaining an intermediate portion in the form of a flat column with opposing projecting wings;

(d) forming insert grooves by compressing opposite sides of a center of said intermediate portion inward to form a recessed groove with an obtuse angle on a first side, and a roughly-shaped insert groove on a second side, said roughly-shaped insert groove then being pressed toward said recessed groove to form trapezoidal insert grooves;

(e) compressing and trimming each said material unit so that said opposing projecting wings are compressed inward and forged with two symmetrical recessed grooves, said two recessed grooves respectively formed with an obtuse angle, said two recessed grooves each having a circumferential edge forged outward and trimmed, each said material unit thereby becoming a half-finished product;

(f) punching said two recessed grooves of said half-finished product so as to form a through hole in said material unit;

(g) forging said opposing projecting wings into two curved wings; and, (h) cutting threads into said through hole to form a finished wing nut.

\* \* \* \* \*